United States Patent [19]

Sabés

[11] 4,134,489
[45] Jan. 16, 1979

[54] COUPLING DEVICE FOR A SCRAPER CONVEYOR TUB

[75] Inventor: Jean Sabés, Anzin, France

[73] Assignee: Societe Anonyme dite: J. Sabés & Cie, Anzin, France

[21] Appl. No.: 712,060

[22] Filed: Aug. 5, 1976

[30] Foreign Application Priority Data

Aug. 6, 1975 [FR] France .............................. 75 24547
Feb. 16, 1976 [FR] France .............................. 76 04209

[51] Int. Cl.² .............................................. B65G 21/00
[52] U.S. Cl. ................................. 198/861; 198/584; 198/725; 198/758; 403/316; 403/337; 403/363
[58] Field of Search ............... 198/861, 758, 717, 725, 198/583, 584; 193/2 A, 35 J; 403/13, 14, 316, 335, 337, 363

[56] References Cited

U.S. PATENT DOCUMENTS

| 2,031,054 | 2/1936 | McCarthy | 198/861 |
| 3,300,031 | 1/1967 | Doinmann et al. | 198/861 |
| 3,583,552 | 6/1971 | Renwick | 198/861 |

FOREIGN PATENT DOCUMENTS

| 315187 | 6/1918 | Fed. Rep. of Germany | 198/758 |
| 333737 | 4/1919 | Fed. Rep. of Germany | 198/758 |

Primary Examiner—John J. Love
Assistant Examiner—Douglas D. Watts
Attorney, Agent, or Firm—Mason, Fenwick & Lawrence

[57] ABSTRACT

The invention relates to a coupling device acting between to adjacent tubs of a scraping conveyor for mines in which each tub comprises two side members.

The recesses for the abutment flanges, like the access openings, are laterally accessible. The retaining partition of the male connecting member is positioned behind the projecting portion of this member. The cross-section of the connecting spindle has dimensions which differ in at least two directions, which are preferably perpendicular to one another. As regards the partition, the width of the access opening of each connecting member is smaller than the maximum dimension, but greater than the minimum dimension of the spindle cross-section. The spindle locking means are arranged so as to prevent the spindle appearing in front of the opening in a position in which the small dimension of its cross-section coincides with the width of the said opening.

8 Claims, 32 Drawing Figures

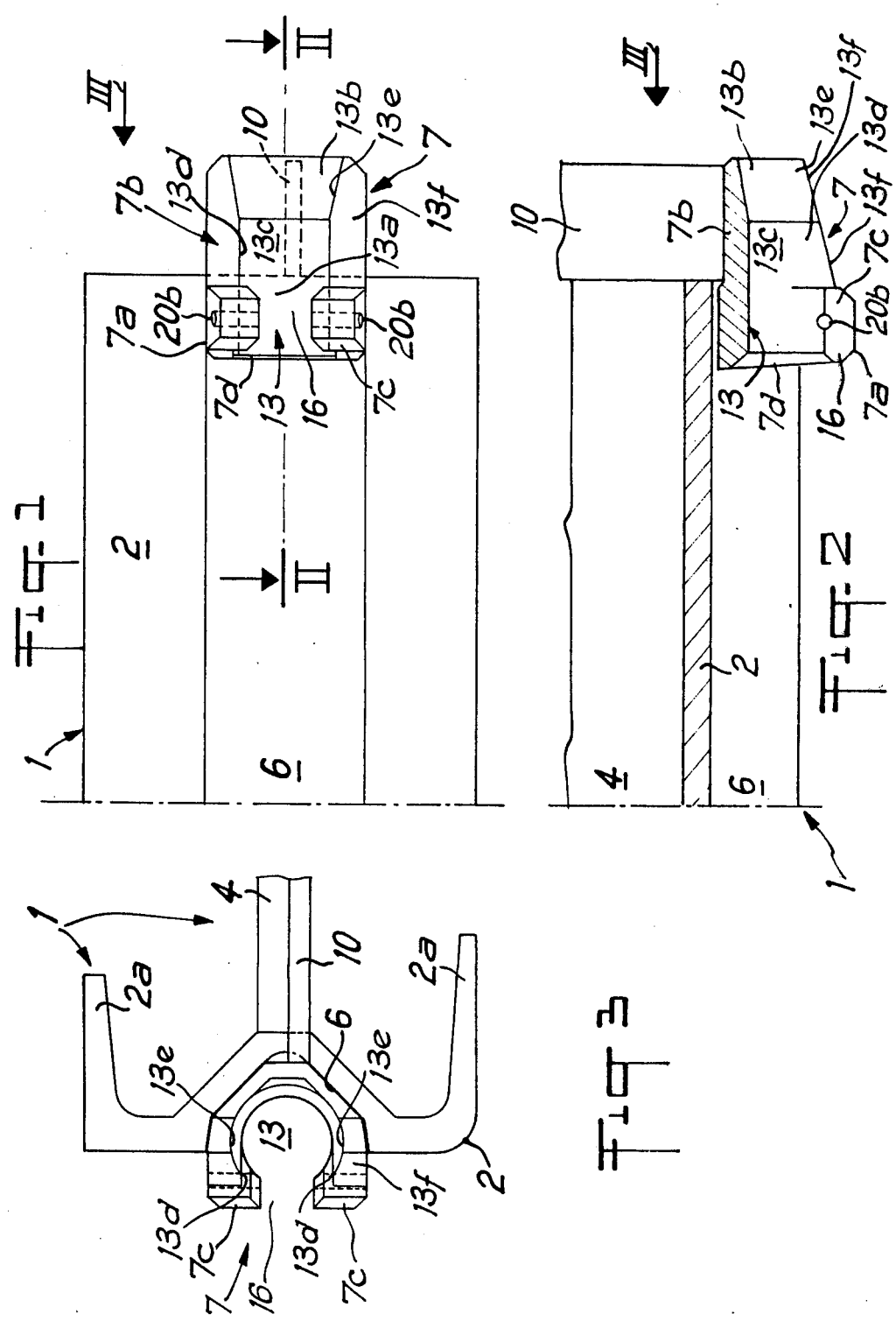

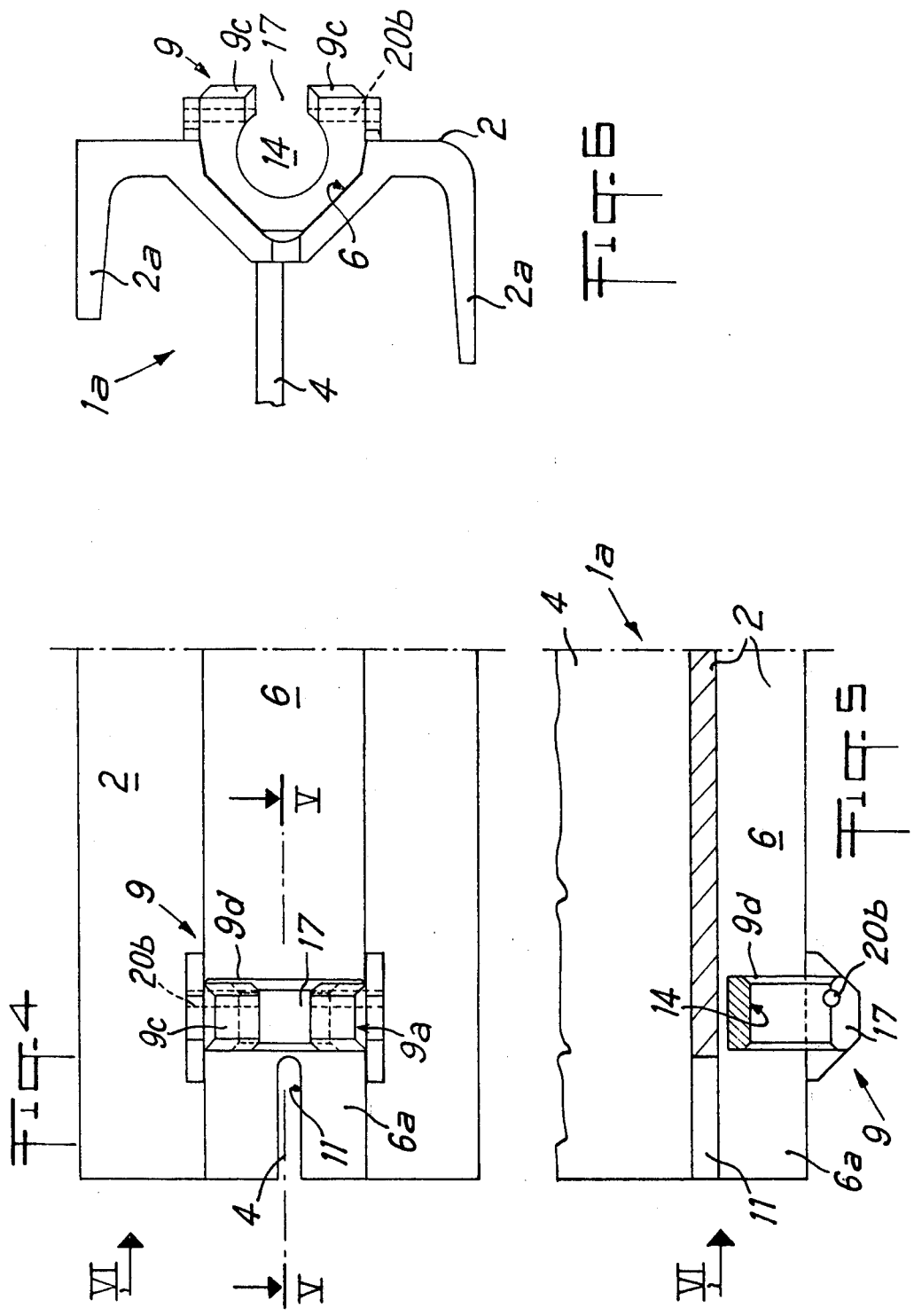

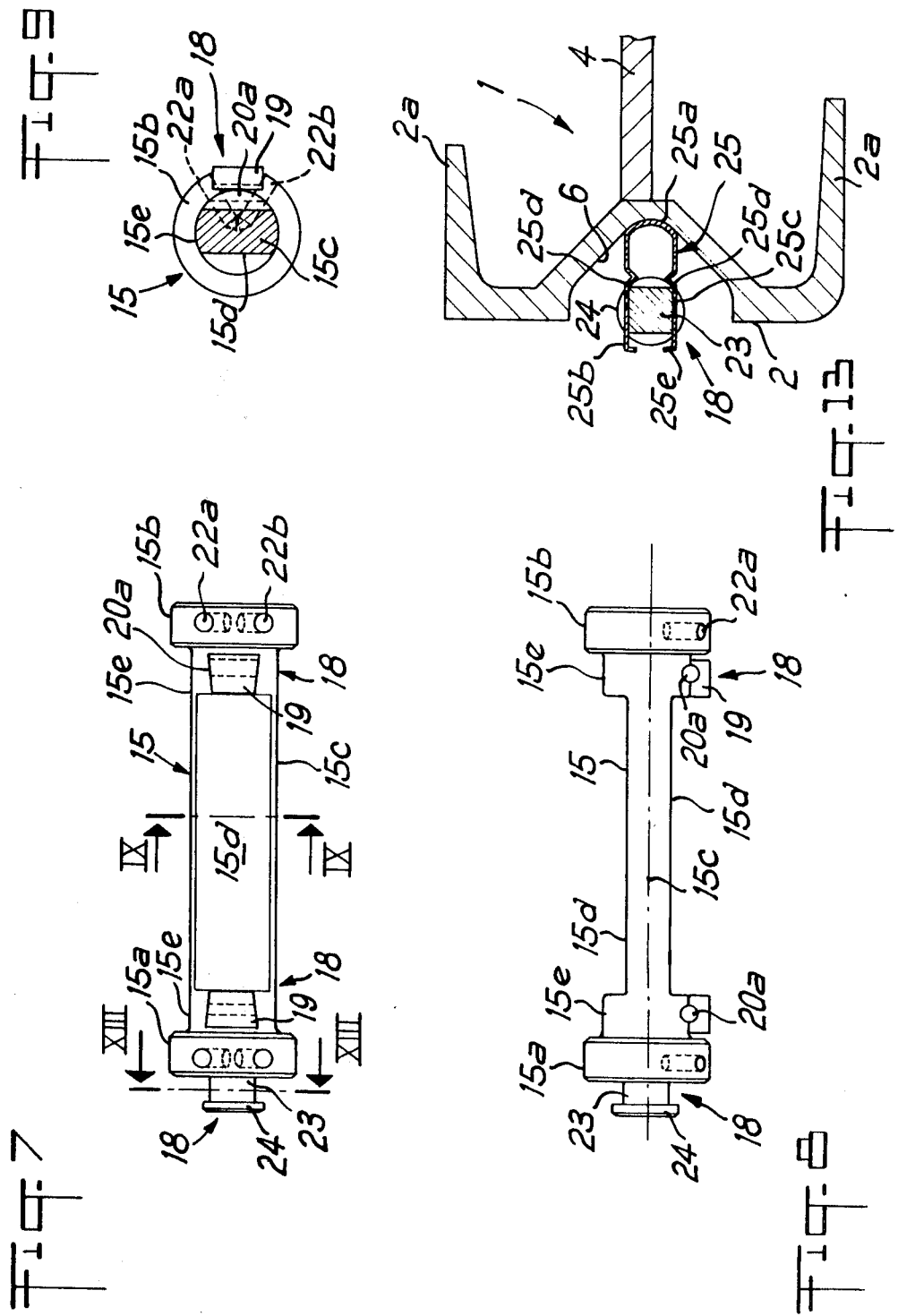

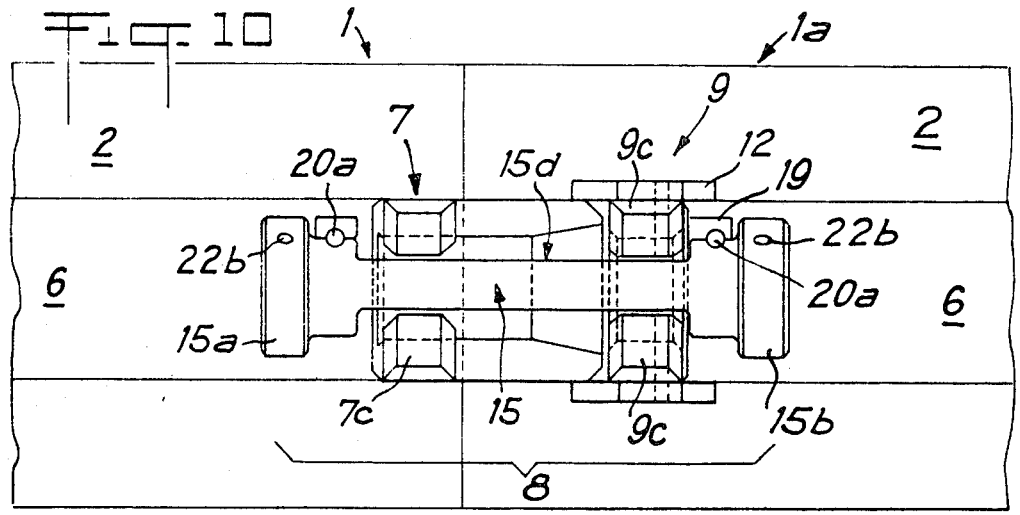
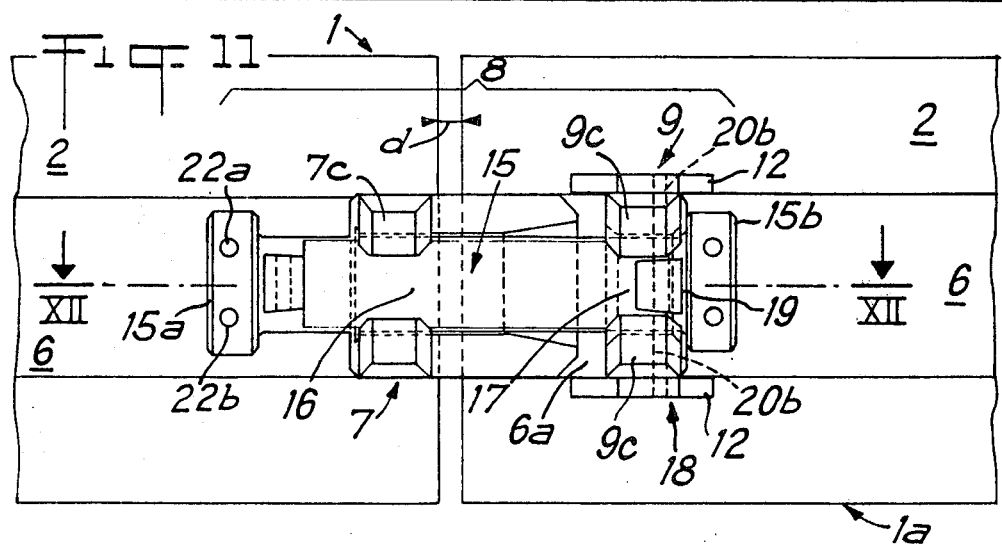
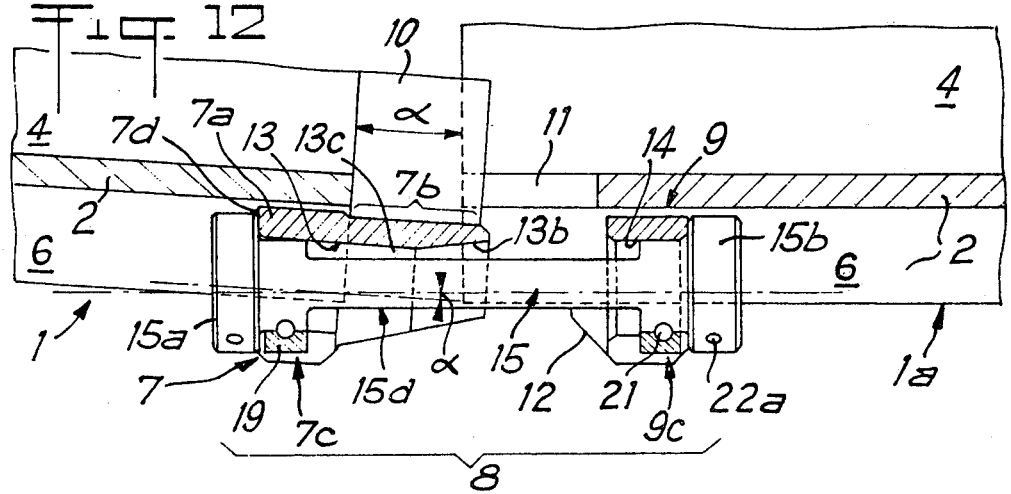

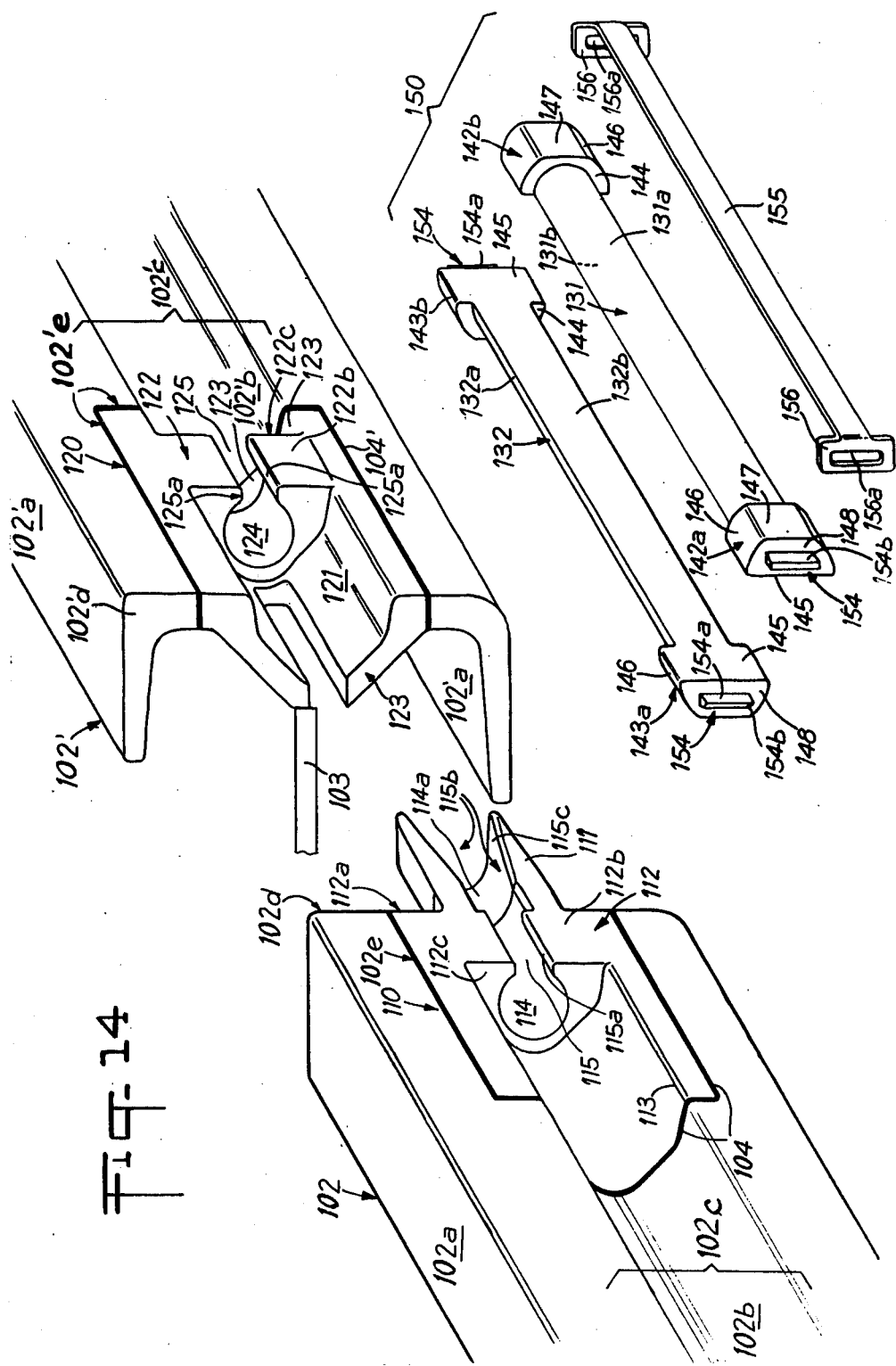

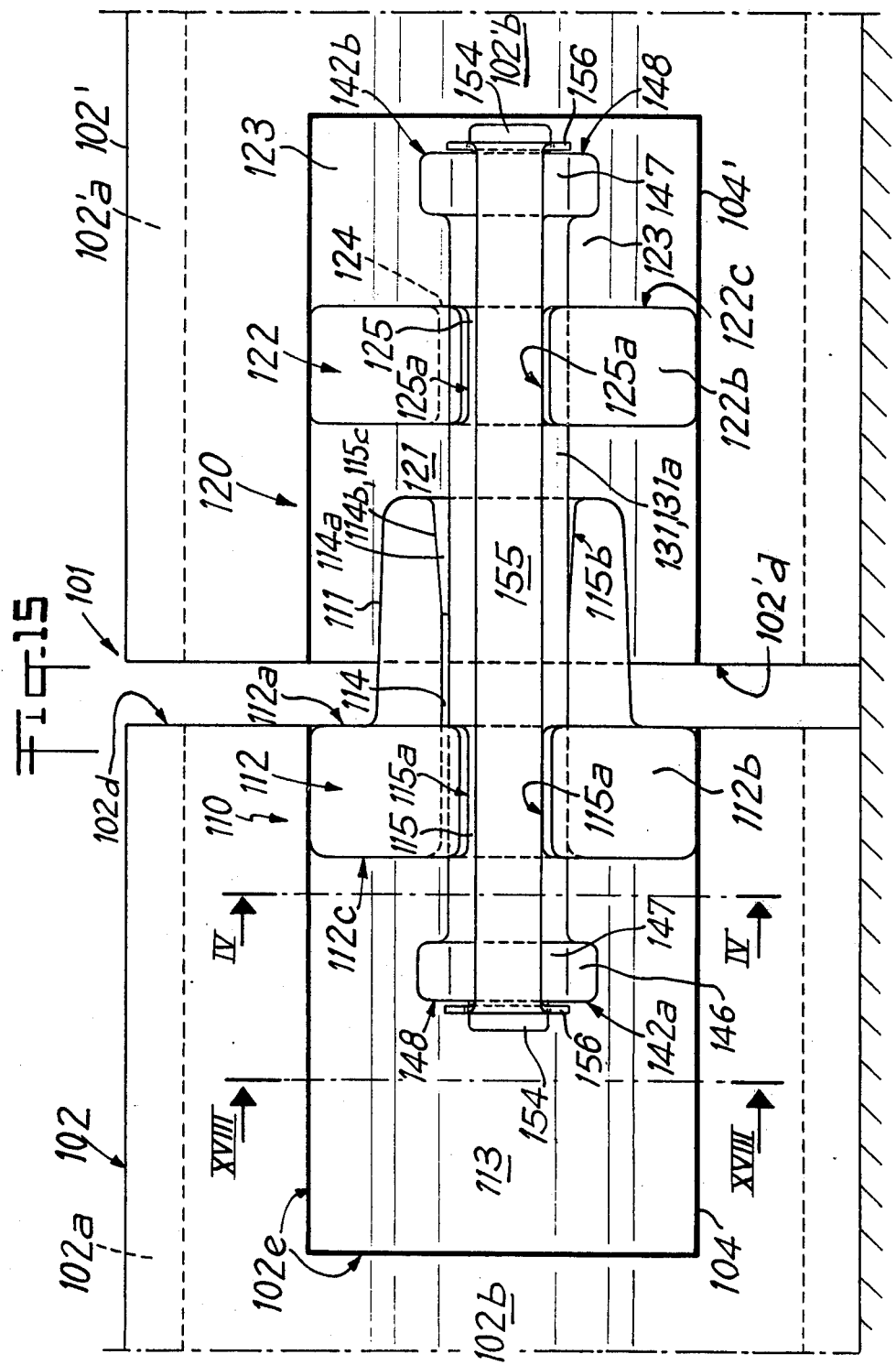

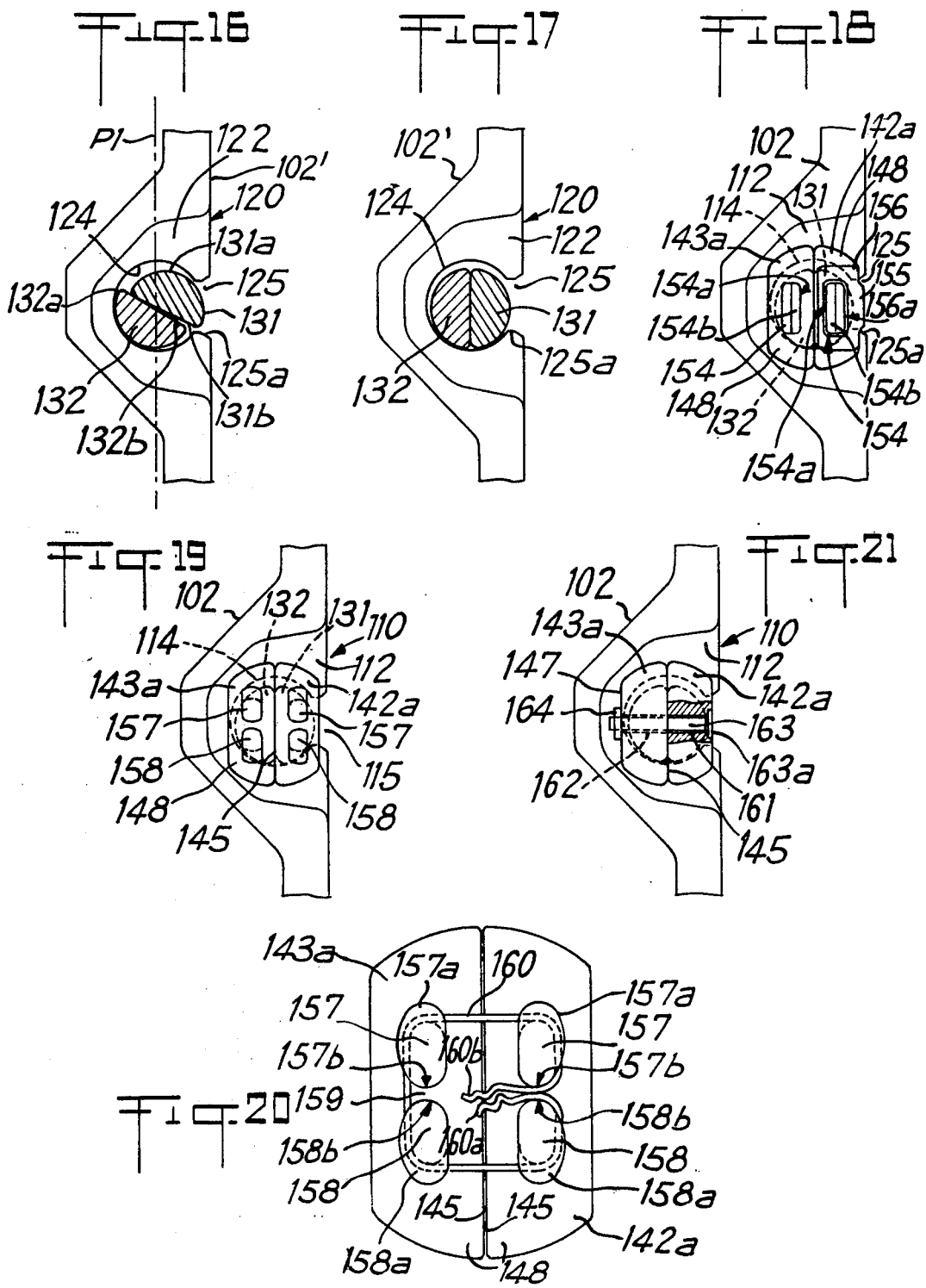

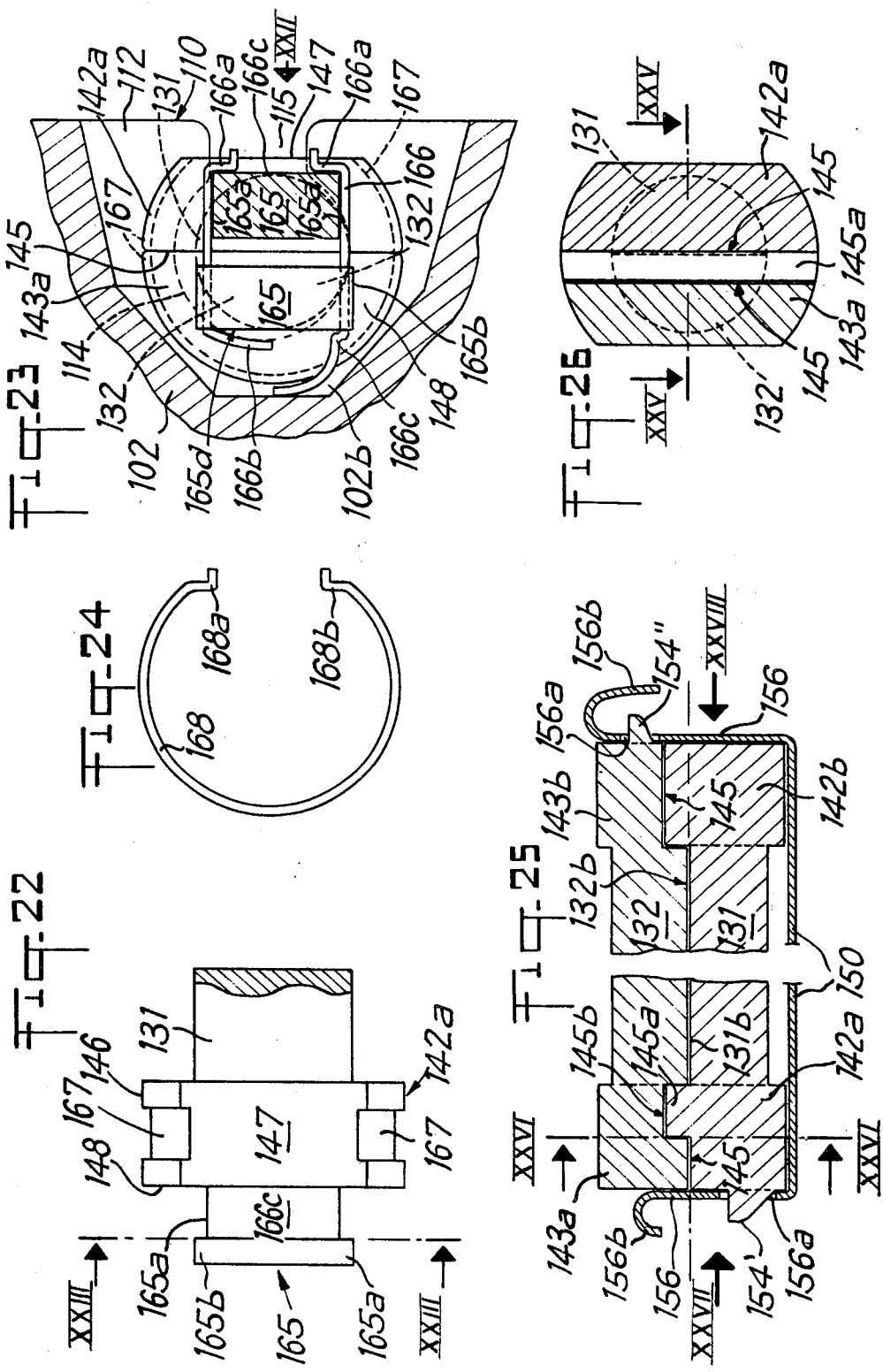

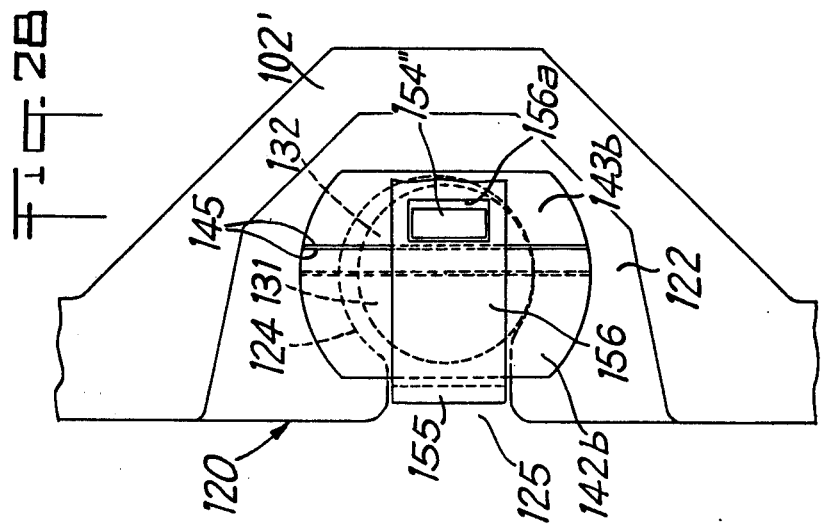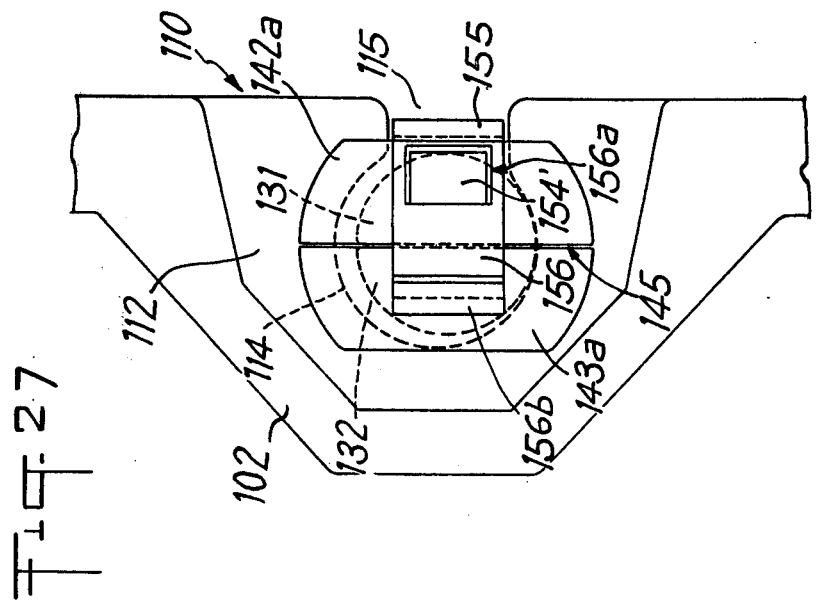

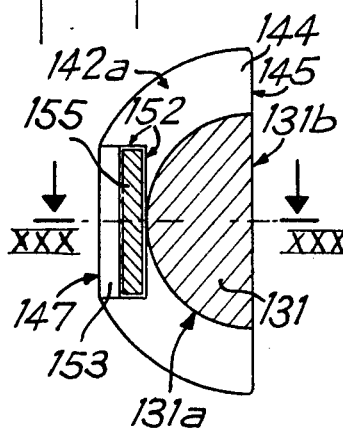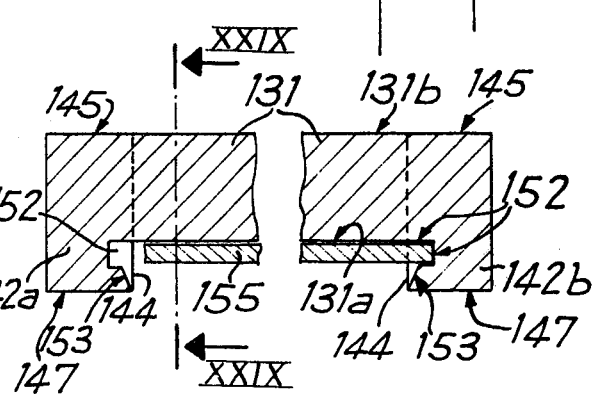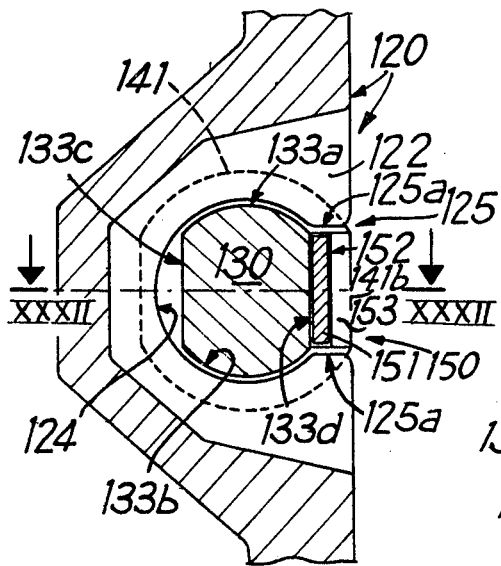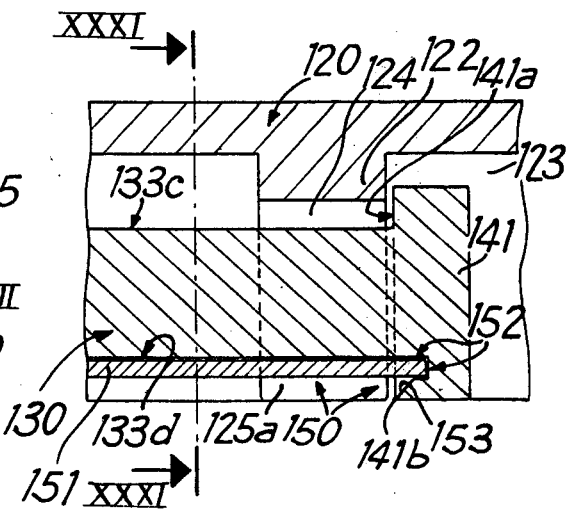

COUPLING DEVICE FOR A SCRAPER CONVEYOR TUB

BACKGROUND OF THE INVENTION

The present invention relates to a coupling device between two adjacent tubs of a scraper conveyor for mines, in which each tub comprises side members each having two superimposed lateral branches which are turned towards the inside and have between them an externally open longitudinal groove and which are arranged symmetrically relative to the vertical median plane of the tub, being joined together along a central longitudinal zone by a median plate and which have a preferably inverted M or sigma-shaped profile, said coupling device being of the type comprising a male connecting member integral with one of the ends of a side member, a female connecting member integral with the other end of the same side member, each of said connecting members being equipped with a retaining partition, a longitudinal slot and a lateral access opening issuing into the said slot, a connecting spindle having two abutment flanges and which can be inserted into or removed from the slots via the access openings of the said members when the latter are at least approximately aligned and brought adjacent with one another, a recess for one of the abutment flanges located to the rear of the corresponding retaining partition, as well as locking means for preventing the spindle from unexpectedly moving out of the slots of the said connecting members, whereby the flanges of the said spindle serve to bear against the corresponding retaining partition so as to permit the transmission of tensile stresses between two adjacent tubs, the male connecting member having a male guidance member or projecting portion which longitudinally projects beyond the corresponding side member and the female connecting member has a female guidance portion such as a connecting cavity serving to receive the said male member.

A coupling device of this type is known, for example, from French Pat. No. 2,016,116. In the case of the known device, the locking means act on the abutment flanges in such a way as to prevent their axially leaving their guidance recesses which retain and laterally guide the abutment flanges and which are only laterally accessible via the cylindrical spindle through the access openings, whose width is slightly larger than the diameter of the spindle and is equal to the diameter of the semi-cylindrical slot for the connecting spindle. Therefore, the cross-section of the connecting pin is relatively small compared with the overall dimensions of the coupling device. Moreover, the male connecting member of the known device has a transverse retaining partition which is located at the front end of the projecting portion. Thus, this arrangement also considerably limits the possibilities of transmitting high tensile stresses.

Another coupling device of approximately the same type as that mentioned hereinbefore is known, for example, from British Pat. No. 759,031 or French Pat. No. 1,114,925. In the case of this known device, the slots comprise cylindrical holes made in the connecting members and the joining member identical to the connecting spindle is constituted by a screw bolt and a nut, the bolt being threaded in the aligned slots of the corresponding connecting members, whereby the bolt head and the nut screwed onto the bolt after its longitudinal introduction into its two slots bear, if applicable, on the rear faces of the connecting members which surround the slots. The length of the joining member and more precisely the distance between the bolt head and the nut is generally sufficient to obtain a type of articulation between the two coupled tubs, said articulation leading to three degrees of freedom of movement in three directions starting from the theoretical centre of the coupling device, one of these directions being parallel to the conveyor travel direction and the two other directions are perpendicular to one another and to the said first direction.

The conveyor is displaced along the floor (wall) during a scraping operation or lateral displacement which comprises displacing the said conveyor in the direction perpendicular to the side members and parallel to the median plates of the tubs in sections, i.e. by several tubs, either immediately after the passage of the mining machine in the area of the section in question or after the return travel of the said machine.

During the scraping operations, the coupling devices between the tubs are very highly stressed. Thus, during the scraping of a subassembly or section of tubs, these devices are subject to high pressures and stresses and more particularly this applies to the coupling device connecting the final displaced tub to the first tub which has still not been displaced. The stresses acting on the different members of the coupling device are both longitudinal and transverse and are dependent on the force developed by the scraping jacks, the spacing between the said jacks, the slope and the weight of the conveyor.

The bolts and their threads, as joining members, are subjected to deformations which, even if they do not lead to a break, prevent any realignment and uncoupling between two adjacent tubs. The breakage of a coupling device leads, as is known, to incidents such as the rapid deterioration of the tub ends. The uncoupling of the tubs from one another, the breakage of movable equipment (pull chains and scrapers), etc.

Moreover, in the known coupling device, the fitting of a bolt, followed by the screwing of the nut onto the bolt and the locking of the nut are long and difficult operations.

BRIEF SUMMARY OF THE INVENTION

The present invention obviates the disadvantages and has the object of providing a coupling device of the type mentioned hereinbefore, which permits more particularly the transmission of large tensile stresses for reduced overall dimensions and which facilitates the coupling and uncoupling operations of two adjacent tubs.

According to the invention, this is achieved in that the recesses for the abutment flanges are also laterally accessible, like the said access openings, the retaining partition of the male connecting member is located behind the projecting portion of the said member, the cross-section of the connecting spindle has, at least during the fitting of the said spindle in the slot and during its removal from said slot different dimensions in at least two directions which are preferably perpendicular to one another, with regard to the retaining partition the width of the access opening of each connecting member is less than the maximum dimension but more than the minimum dimension of the cross-section of the said spindle and the locking means of the said spindle are arranged in such a way as to prevent the spindle from appearing in front of the access opening in a position in which the small dimension of its cross-section coincides with the width of the said access opening.

As a result of this arrangement, it is possible to use on the one hand the portions of the retaining partition defined by the junction areas between the slot and the access opening and on the other the connecting spindle itself and not the abutment flanges for preventing an unexpected lateral removal of the said spindle, whereby however, the latter still maintains its axial mobility where appropriate. Thus, a coupling device of simple construction and reduced overall dimensions is obtained permitting the rapid assembly of two adjacent tubs, the subsequent maintaining of this assembly despite the application of high tensile stresses thereto and finally the disassembly of this assembly without the slightest difficulty, unexpected uncoupling being impossible.

In certain cases, it is advantageous for the locking means of the connecting spindle to have retaining grips formed in the retaining partitions in the vicinity of the access openings thereof.

In order to make it possible to use a very strong linking member, the connecting spindle is given a cylindrical shape and on the one hand is provided with two parallel flats which are spaced from one another by a distance less than the minimum height of the lateral opening and on the other has a diameter which is at least slightly less than the minimum diameter of the slot, but greater than the minimum height of the said lateral opening, whilst the locking means of the joining member are arranged in such a way that it is maintained in an angular position relative to the edges of said access openings.

In this case, it is particularly appropriate for the locking means to be arranged in such a way that the connecting spindle is maintained in the slots in a position in which the flats of the said spindle are inclined, preferably by 90° relative to the edges of the said access opening.

When the connecting spindle is subject to tensile stresses, the rear faces of the retaining partitions each serve as a supporting face against which one of the abutment flanges can bear.

To facilitate the locking of the connecting spindle in a slot, the connecting spindle can be given at least one entirely cylindrical portion, located in the immediate vicinity of one of the abutment flanges.

In this case, it is also advantageous for the locking means to have at least one locking wedge fixed onto one end of the connecting spindle close to an abutment flange and parallel to a flat.

In this case, the height of the locking wedge is slightly less than the spacing of the edges delimiting the corresponding access opening.

In this context, the locking wedge and the retaining partition can also be provided with holes which, on the one hand, can be aligned when the said wedge is engaged in the access opening of the partition and on the other can receive a locking pin.

According to a feature of the invention, the recesses for the abutment flanges are constituted by a portion of the longitudinal groove of the side member or by a portion of a groove provided in the connecting member, aligned with the longitudinal groove of the side member and having the same cross-section as the said longitudinal groove of the said side member. In this way, a large amount of space is acquired and larger dimensions can be given both to the abutment flanges and to the connecting spindle.

When the locating groove for the abutment flanges must form part of the connecting members, each retaining partition is given, at least on its rear side, a profiled section which has the same sectional configuration as the median branch of the side member and which defines a groove section serving as a recess for one of the abutment flanges.

Advantageously, the connecting spindle provided comprises two connecting rods of the same length having, on the one hand, cross-sections each inscribed in a half circle and whereof the minimum dimension is slightly smaller than the maximum width of the access openings and, on the other hand, at least two lateral faces of different configurations, whereof one, the so-called contact face, serves to bear against or is juxtaposed with the contact face of the other connecting rod and whose other face, called the bearing face, has an at least partly cylindrical configuration and serves to constitute, with the bearing face of the other connecting rod, the outer surface of the assembly of the two rods, whereby the contact faces extend at least approximately in the direction of the maximum dimension of the cross-section of the connecting spindle. This arrangement makes it possible to give the connecting spindle a considerable cross-section, despite the fact that the access opening has a relatively small width.

Preferably, the contact face of each connecting rod is planar and is located in the diametrical of the half circle in which is inscribed the cross-section of the said rod.

Each connecting rod has at each end an abutment flanges, whereof one lateral face, called the contact face, is parallel to the contact face of the corresponding connecting rod and serves to bear against the lateral contact face of the corresponding abutment flange of the other connecting rod.

The contact face of at least one abutment flange of one of the connecting rods projects relative to the contact face of the said rod and the contact face of at least one abutment flange of the other connecting rod is retracted from the contact face of the latter, whereby the distance between the projecting contact face of the abutment flange of one of the connecting rods and the contact face of the said rod is equal or slightly less than the distance between the retracted contact face of the corresponding flange of the other connecting rod and the contact face of the latter. It is consequently possible for one of the connecting rods to drive the other in its axial movement following at least one of the two axial directions.

Advantageously, the locking means are integral with at least one of the abutment flanges of the connecting spindle or at least one of the connecting rods forming the same.

Preferably, at least one of the locking means is at least temporarily integral with the connecting spindle and is able to cooperate with a stationary portion of at least one of the connecting members or with the side member with which the latter is integral.

When the connecting spindle comprises at least two connecting rods, each provided with two abutment flanges, at least the first of the locking means is integral with at least one of the abutment flanges of at least one of the connecting rods and another locking means can be fixed in a detachable manner to the said first locking means and can cooperate with a stationary portion with at least one of the connecting members or with the side member with which the latter is integral.

In certain cases, it is advantageous for the locking means to have a parallelepipedic shoulder fixed to one of the abutment flanges of the connecting spindle and surmounted by a retaining disk as well as a circlip able to cover the two parallel faces of the shoulder and engage in the base of the recess of the said flanges.

In the case where the connecting spindle comprises at least two connecting rods, each fitted with an abutment flange, at least a first of the locking means is integral with at least one of the two abutment flanges of at least one of the connecting rods and a second locking means is integral with at least one of the two abutment flanges of at least one other connecting rod and a third locking means is detachable and arranged in such a way that it can be mounted on the two other first and second locking means in such a way as to attract the said connecting rods against one another.

The locking means comprise, on the one hand, each abutment flange of the connecting spindle or of one of the connecting rods from which it is formed, a lug having a random cross-section but with one side parallel to a radial plane of the spindle or of the rod and which extends parallel to the latter and, on the other hand, a locking strip whose length is substantially the same as that of the spindle, including the height of the two corresponding abutment flanges, which has a width less than that of the access opening and has at its ends, two flange members curved perpendicular to its intermediate longitudinal portion, whereby each of the said flange members is provided with a locking opening, whose cross-section is slightly greater, but of the same shape as that of the corresponding lug, whereby the distance between the opening and the intermediate portion of the locking strip is such that the said portion is engaged in the access opening when the lug is engaged in the corresponding locking opening.

The locking means comprise a retaining member integral with at least one of the abutment flanges of the spindle or one of the connecting rods and provided with a locating groove extending in a plane perpendicular to the spindle axis or the connecting rod axis, as well as a locking clip which, on the one hand, can be fixed detachably but in non-rotary manner relative to the said spindle or rod in the locating groove of the said retaining member and, on the other hand, can cooperate with the base of the longitudinal groove of the side member or the corresponding connecting member.

The locking means are designed in such a way as to comprise on at least one of the flanges of each of the connecting rods of the same end of the said rods, a retaining member provided with a locating groove which opens out in a plane perpendicular to the axis of the said rods, as well as a locking clip which can be fixed in detachable manner in the groove of each retaining member and can attract the flanges and the rods against one another.

The locating groove of the retaining member can have an annular configuration.

It is also possible for the retaining member to be formed by the shoulder of the abutment flange which radially overhangs the connecting spindle, whereby the locating groove is made in the said flange starting from the lateral peripheral face thereof.

To facilitate contact between a locking means, such as a clip and the abutment flange, the latter has on its periphery a portion with a planar face, such as a flat, which is preferably parallel to the contact face of the said flange.

According to another feature of the invention, the locking means comprise a locking strip and the abutment flange at each end of one of the connecting rods or the connecting spindle has, on its abutment face in the vicinity of the access opening, a locking recess extending parallel to a radial plane of the said rod or spindle and which serves to receive one of the ends of the said locking strip.

BRIEF DESCRIPTION OF THE DRAWINGS

Other and further objects of the present invention will be apparent from the following description and claims and are illustrated in the accompanying drawings, which by way of illustration, show preferred embodiments of the present invention and the principles thereof, and what are now considered to be the best modes contemplated for applying these principles. Other embodiments of the invention embodying the same or equivalent principles may be used and structural changes may be made, if desired, by those skilled in the art, without departing from the invention and the scope of the appended claims.

In the drawings show:

FIG. 1 a side elevational view of an end of the tub equipped with a male connecting member of the coupling device.

FIG. 2 a plan view of a cross-section of part of the end of the tub along the line II—II of FIG. 1.

FIG. 3 is a front elevational view in accordance with the arrow III of FIGS. 1 and 2.

FIG. 4 a side elevational view of one end of the tub equipped with a female connecting member of the coupling device.

FIG. 5 a plan view of a cross-section of part of the end of the tub along the line V—V of FIG. 4.

FIG. 6 a front elevational view in accordance with the arrow VI of FIGS. 4 and 5.

FIGS. 7 and 8 are elevational and plan views of the connecting spindle.

FIG. 9 a cross-section of the connecting spindle along the line IX—IX of FIG. 7.

FIG. 10 a side view of the two tub ends assembled by means of a coupling device according to the invention, said device being located in the connecting spindle fitting position.

FIG. 11 a side view identical to that of FIG. 10 but with the connecting spindle in its locking position.

FIG. 12 a plan view of a cross-section of the corresponding ends of two adjacent tubs along the line XII—XII of FIG. 11, but with the two ends angularly displaced in the horizontal sectional plane and spaced from one another in the limits permitted by the coupling device.

FIG. 13 a vertical sectional view of a tub side member with reference to a possible embodiment of a locking means for the connecting spindle, along the line XIII—XIII of FIG. 7.

FIG. 14 a perspective exploded view of another embodiment of the coupling device according to the invention.

FIG. 15 a side elevational view of the coupling device according to FIG. 14.

FIG. 16 a partial vertical sectional view of the coupling device.

FIG. 17 a partial vertical sectional view identical to that of FIG. 16 and along the line XVII—XVII of FIG. 15.

FIG. 18 a front view in elevation and partly in section of an end portion of the coupling device along the line XVIII—XVIII of FIG. 15.

FIG. 19 a front view in elevation and partly in section of another embodiment of an end portion of the coupling device.

FIG. 20 an enlarged view showing a detail of FIG. 19.

FIG. 21 a front view in elevation and partly in section of a further embodiment of an end portion of the coupling device.

FIG. 22 a side elevational view of one element of the end portion of several other embodiments of the coupling device in accordance with the arrow XXII of FIG. 23.

FIG. 23 a front elevational view partly in section of several other embodiments of the device according to the invention along the line XXIII—XXIII of FIG. 22.

FIG. 24 a side elevational view of a locking ring to be associated with one of the embodiments shown in FIGS. 22 and 23.

FIG. 25 a plan view of a cross-section of several components of the coupling device along the line XXV—XXV of FIG. 26.

FIG. 26 a front view of a vertical section along the line XXVI—XXVI of FIG. 25.

FIG. 27 a front elevational view of the left-hand end of the coupling device following the arrow XXVII of FIG. 25.

FIG. 28 a front elevational view of the right-hand end of the coupling device following the arrow XXVIII of FIG. 25.

FIG. 29 a front view of a vertical section of several components of the coupling device in accordance with the line XXIX—XXIX of FIG. 30.

FIG. 30 a plan view of a cross-section of the said components, following the line XXX—XXX of FIG. 29.

FIG. 31 a front view in elevation and partly in vertical section of an end portion of another embodiment of the coupling device following the line XXXI—XXXI of FIG. 30.

FIG. 32 a plan view of a cross-section along the line XXXII—XXXII of FIG. 31.

DETAILED DESCRIPTION OF THE PREFERRED EMBODIMENTS

As can be seen in FIGS. 1 to 13, each chute or tub 1 of a scraper conveyor for mines comprises two parallel side members 2 and a median flat plate 4 which determines the distance between the two side members 2 and which interconnects them at approximately half their height. The cross-section of the side members 2 is inverted M or sigma-shaped. The two side members 2 are arranged symmetrically to one another in such a way that the horizontal branches 2a of one of the side members extend towards those of the other side member and the median groove or cavity 6 of each side member is located on the outside of the tub, the cross-section of said groove or cavity 6 being approximately V-shaped.

On one of the ends of tub 1, each side member 2 has a male connecting member 7 of the coupling device 8 (see also FIGS. 10 to 12), whose female connecting member is fixed to the other end of the same side member and therefore to the adjacent end of the following tub 1a. The male and female connecting members 7 and 9 have in part a periphery which is precisely adapted to the shape of the median groove 6 to which they are fixed, for example, by welding. The rear portion 7a of the male member 7 has virtually an identical design to that of the female member 9 (cf particularly FIGS. 1 to 6). The front portion 7b of male member 7 projects beyond the corresponding end of the side member 2 in the direction of the adjacent tub 1a and has a length such that in the contact position between the front faces of side members 2 of adjacent tubs 1 and 1a (cf FIG. 10) the end face of the front portion 7b of male member 7 is only spaced from the corresponding front face of female connecting member 9 by a small distance, such as, for example, one millimeter. Thus, as soon as the front faces of side members 2 become somewhat worn, the front faces of the male and female connecting members 7 and 9 bear against one another, thus contributing to the transmission and taking up of longitudinal compressive forces. These male and female abutment members 7 and 9 can, moreover, be constructed from a stronger material than that used to form the side members or at least the central portion of the said side members. The front portion 7b of the male member 7 has a periphery which, with a certain lateral clearance, fits into the front portion 6a of the median groove 6, whereby portion 6a if located in front of the female member 9 and serves to receive the said front portion 7b of male member 7.

The front portion 7b of the two male members 7 fixed to the same tub 1 are joined together by a connecting or wear-resisting plate 10 welded both to the outer face of the said front portions 7b and to the corresponding end of the median plate 4. Obviously, at least the largest portion of the connecting or wear-resisting plate 10 is located below the level of the inner face of median plate 4, to enable it to slide underneath the median plate 4 of the adjacent tub 1a and optionally cover the opening formed during the spacing apart of two adjacent tubs 1 and 1a (cf FIGS. 1 to 3 and 12). So that the median plate 4 of the adjacent tub 1a and the connecting plate 10 can overlap during the moving together of tubs 1 and 1a, the portion of the side member located in front of the connecting member 9 has an oblong recess 11 made parallel to the horizontal branches 2a in the median portion in the form of a groove 6 of side member 2 (FIGS. 5, 6 and 2), said oblong recess 11 serving to receive the connecting plate 10.

As soon as adjacent tubs 1 and 1a are spaced from one another by a certain distance d, they have a certain vertical mobility relative to one another which, is obviously limited by the vertical clearance existing between the grooves 6 of the side member and the front portion 7b of the male connecting member 7 (FIG. 11).

Each connecting member 7 and 9 has a slot 13 and 14 which extends axially from end to end of the corresponding member and which serves to receive with a certain lateral clearance, a joining member 15 which also performs an integral part of the coupling device 8 and which is constituted, for example, by a monobloc connecting spindle. The shape of the slot 13 and 14 is at least approximately cylindrical or slightly bitruncated cone-shaped, at least as regards the rear portions of retaining partitions 7a, 9a of the male connecting member 7 and female connecting member 9. The front portion of slot 13 of male member 7 preferably has a truncated cone shape 13b which widens towards the front end of said male member 7, connecting within member 7 to the cylindrical portion 13a of slot 13.

In order to rapidly establish the coupling between two adjacent tubs, each connecting member 7 and 9 has, on its outside, i.e. its side remote from the side member to which it is fixed, a lateral access opening 16 or 17 extending over the entire length of the corresponding connecting member 7 or 9 and which laterally issues into the slot 13 or 14. Access opening 16 or 17 is located on either side of the horizontal plane passing through the axis of slot 13 or 14 and optionally coinciding with the plane of symmetry of the median groove 6 of side member 2. On the retaining partition 7a of male member 7 and on the retaining partition 9a of female member 9, opening 16 or 17 has a height which is less than the diameter of the rear portion of the corresponding slot 13 or 14. Thus, as regards retaining partitions 7a, 9a, openings 16, 17 is defined by a type of double retaining grip 7c or 9c forming an integral part of connecting members 7 or 9 and which partly encircles a portion of the monobloc connecting spindle 15, when the latter occupies a given position. With respect to the front portion 7b of member 7, the height of access opening 6 is identical to the diameter of slot 13 considered in the vertical radial plane. With reference to the front portion 7b of male member 7, the slot 13 comprises a cylindrical portion 13c of semicircular cross-section followed by the truncated coneshaped portion 13b, also of semi-circular cross-section. These two semi-circular portions 13c, 13b are located on the side of side member 2 and are followed laterally towards the outside, starting from the vertical radial plane passing through the axis of slot 13 on the one hand by projections with horizontal inner faces 13d and on the other by projections with inclined inner faces 13e following the two generating lines of the truncated cone-shaped portion 12b, said generating lines being located in the vertical radial plane of slot 13. Projections 13d and 13e are, moreover, delimited by a vertical lateral flat face 13f inclined from the outside towards the inside in the direction of the front end of the male connecting member (cf FIGS. 1 to 3 and 10 to 12).

The connecting spindle 15 is provided at each end with an abutment flange 15a, 15b serving to bear on the rear support face 7d or 9d of the corresponding connecting member 7 or 9. this spindle 15 has the shape of a cylindrical rod 15c, in one piece with the abutment flanges 15a, 15b and having two flats or flat faces 15d, which are parallel to one another and spaced from one another by a distance less than the minimum height of access opening 15 or 17 with reference to the opposite edges of the retaining grips 7c or 9c of connecting member 7 or 9. The remainder of the surface of rod 15c is cylindrical, whereof the diameter is such that on the one hand, there is a certain clearance, for example, of the order of 1 to 4mm between the cylindrical surface of circular cross-section of connecting spindle 15 and the inner face delimiting the slot 13 or 14 and, on the other hand, the spindle 15 cannot laterally move out of the connecting members 7 and 9 when the flats 15d are inclined relative to the opposite faces of grips 7c or 9c, said faces being opposite to one another and defining the access openig 16 or 17 with reference to the retaining partitions 7a, 9a. The flats 15d can extend over the entire length of spindle 15 and optionally even pass beyond the same by extending also up to abutment flanges 15a, 15b, which would not then have a cylindrical circumference entirely closed on itself. Obviously, the diameter of the abutment flanges 15a, 15b is substantially the same as the external diameter of the support face 7d or 9d of the retaining partitions 7a, 9a of connecting members 7, 9. The length of the portion of the intermediate rod 15c which comprises the flats 15d is at least equal to the minimum spacing of support faces 7d and 9d of retaining partitions 7a and 9a when adjacent tubs 1 and 1a are positioned close to one another (cf FIG. 10). However, the total length of the connecting spindle 15 between the abutment flanges 15a and 15b is such that the ends of the side members 2 of adjacent tubs can be spaced from one another by a distance which is only slightly less than the width of the connecting or wear-resisting plate 10 between the two male abutment members 7 of the same tub 1 (cf FIG. 12).

According to the embodiments shown in FIGS. 7 to 12, the two parallel flats 15d do not extend over the entire length of the connecting spindle 15 but instead stop at a certain distance from the abutment flanges 15a, 15b, in such a way that the spindle 5 has ends 15e whose cylindrical periphery of entirely closed circular cross-section, whereby the diameter of these cylindrical ends 15e is everywhere equal to that of the circular cylindrical surface of rod 15c, said cylindrical surface being located between the two flats 15d.

One constructional embodiment of the locking means 18 of the connecting spindle in its coupling position, in which it cannot move out of the male and female connecting members 7 and 9 comprises a locking wedge 19 fixed, for example, by welding to one end of the connecting spindle 15 in the vicinity of the corresponding abutment flange 15a or 15b and parallel to a flat 15d. The height of this locking wedge 9 is slightly less than the spacing of the opposite edges of the retaining grip 7c or 9c, said edges defining the access opening 16 or 17. Thus, after laterally introducing spindle 15 to the corresponding slots 13, 14, whilst the flats 15d are parallel to the edges of retaining grips 7c, 9c defining the lateral access openings 16, 17 and whilst the adjacent tubs 1 and 1a are in the moved together position (FIG. 10) it is then merely necessary to pivot spindle 15 by 90°, in such a way that the locking wedge 19 is located level with the access opening and to then axially displace the said spindle 25 until one of its abutment flanges 15a, 15b bears against the corresponding connecting member (15b in FIG. 11, 15a and 15b in FIG. 12). To prevent one of the locking wedges 19 from unexpectedly moving out of the acess opening of the corresponding member both the locking wedge 19 and the connecting member 7 or 9 can be provided with holes 20a, 20b, whereof those (20b) provided on the connecting member are aligned with one another and that (20a) provided in the said wedge 19 is parallel to the flats 15d and can be made to coincide with the holes 20b is such a way that when the wedge 19 is introduced into openings 16 or 17, holes 20a, 20b are aligned and it is then possible to engage a locking pin 21 into holes 20a, 20b. Said pin 21 is not subjected to any shear stress because the tensile stresses applied to spindle 15 are taken up by the abutment flanges 15a, 15b, said pin 21 solely preventing the axial displacement of spindle 15 relative to one of the connecting members 7 and 9 (member 9 in FIGS. 11 and 12). In order to facilitate the pivoting of spindle 15 by a quarter of a turn, radial bores 22a and 22b which are accessible from the periphery of the said flange and from the side adjacent to the locking wedge 19 and defining between them an angle between 60° and 100° are provided on at least one of the abutment flanges 15a, 15b. An actuating member introduced into one or other of the bores 22a, 22b makes it possible to pivot the said spindle in one or other direction.

Normally, adjacent tubs 1, 1a are either contiguous (FIG. 10) or are very close together (FIG. 11). It is only during scraping of the tubs that the latter are spaced apart to the maximum and must therefore have a certain angular freedom, without being detached from one another. It is in this case that the coupling device 8 entirely fulfills its function and permits the transmission of tensile stresses from one tub to the other, without the components thereof suffering any disadvantageous influence.

Another embodiment of the locking means 18 is shown at the left-hand end of FIGS. 7 and 8 and in FIG. 13. These locking means 18 comprise a shoulder 23, having for example a square cross-section, fixed to the free face of one (15a) of the abutment flanges 15a, 15b and coaxially to the latter, whereby two of the lateral faces of said shoulder 23 are preferably parallel to the flats 15d of the intermediate rod 15c. The parallelepipedic shoulder 23 is surmounted at its free end by a retaining disk 24, whose diameter is at least equal to the diagonal of the cross-section of said shoulder 23, in such a way that at least certain marginal portions of said disk 24 project relative to the side faces of the shoulder 23. A circlip 25 made from sprung steel also forms part of the locking means 18. The circlip 25 has, for example, a generally U-shaped configuartion, whose base 25a assumes the shape of the base of median groove 6 of side member 2. The two lateral branches 25b and 25c of circlip 25 are substantially parallel to one another, at least in the area of shoulder 23 and are spaced from one another by a distance slightly less than the spacing of two parallel faces of shoulder 23. At least one of the branches 25b, 25c of circlip 25 has an internal abutment boss 25d which is located at such a distance from the base 25a that the centre-to-centre distance, i.e. the centre of shoulder 23 and the base 25a is at least equal to or greater than the distance between the axis of slot 13 or 14 of connecting member 7 or 9. Thus, shoulder 23 can never accidentally move into the vicinity 25a of circlip 25 beyond the abutment boss 25d of the latter. Therefore circlip 25 prevents shoulder 23 from rotating, but does not prevent it from moving axially. At least one curved retaining finger 25e terminates the free end of one of the lateral branches 25b, 25c of circlip 25 are for example at a distance from the abutment boss 25 which is greater than the width of shoulder 23. means described hereinbefore can undergo a certain number of modifications without passing beyond the scope of the invention. Hereinafter, other locking means will be described which are associated with connecting members mounted on the side members in the form of interchangeable end sections thereof.

As can be seen more especially in FIGS. 14 and 15, the coupling device 100 is provided on two adjacent tubs of a scraper conveyor for mines. Analogously to the embodiments described hereinbefore, each tub has generally two side members 102, 102', each having two lateral superimposed branches 102a and 102'a which extend substantially horizontally inwardly. Between the two lateral superimposed branches 102a, 102'a, is provided a longitudinal groove 2b of 2'b which is delimited on the inside by the median branch 102c, 102'c of side member 102 or 102' and which is laterally open towards the outside. The profile of the median brance 102c, 102'c is preferably in the form of a stylzed V, so that the profile of side member 102 or 102' is therefore in the form of an inverted M or in a sigma. However, it should be noted that the side member profiled is not an essential feature of the invention and other profiles could be used within the scope thereof. The side members 102, 102' of the same tub are arranged symmetrically relative to the vertical median plane of the tub and are joined together along a longitudinal central area by a median plate 103. This tub is substantially known and is, for example, described in French Pat. No. 1,114,925 so that it will not be described in detail here.

The coupling device 100 comprises a male connecting member 110 and a female connecting member 120, each of the said two members being integral with one of the two ends of a side member of the same tub, in such a way that when two tubs are aligned one behind the other, the male connecting member 110 and one of the side members of one of the tubs faces the female connecting member 120 of the other of the two side members of the adjacent tub (FIGS. 14 and 15). The male connecting member 110 has a male guidance member or a projecting portion 111 in the form of a slightly truncated cone-shaped tongue which longitudinally projects beyond the corresponding end of side member 102 and which is to be located at least partly in the female connecting member 120, which therefore has a female guidance member such as a connecting cavity or groove 121. The male connecting member 110 also has, behind the projecting portion 111, a retaining partition 112 which is integral with the rear end of the projecting portion 111 and which is preferably in one piece with the latter. Partition 112 of male connecting member 110 extends transversely to the longitudinal extension of side member 102 and is arranged in such a way that its front face 112 is located in the same vertical transverse plane as the end front face 102d of the said side member 102. In the embodiment shown in FIGS. 14 and 15, the male connecting member 110 also comprises, behind the retaining partition 112, a V-shaped section 113 which has the same sectional shape as the median zone or branch 102c of the side member 102 which delimits the groove section 113a extending the longitudinal groove 102b of said side member and which is connected by its front end to the retaining partition 112, with which it is preferably made in one piece. For fixing the male connecting member 110, the end portion of side member 102 is provided with reference to the median zone or branch 102c with an assembly opening 102e, whose two upper and lower edges are horizontal and whose base is vertical and parallel to the end front face 102d of the side member 102. The male member 110 is fixed in its assembly opening 102e by means of a weld bead 104.

Moreover, as the connecting cavity 121 is in the form of a groove section open towards the front and towards the outside of side member 102', the female connecting member 120 also comprises a retaining partition 122 which is retracted from the front end of the corresponding side member 102' by a distance at least equal to the length of the projecting portion 111 of the male connecting member 110. In the case of the embodiment shown in FIGS. 14 and 15, the female member 120 has a V-shaped section 123 which has the same sectional configuration as the median zone or branch 102'c of side member 102', which defines the groove section or connecting cavity 121 and which is connected by its rear end to the longitudinal groove 102'b of side member 102'. The retaining partition 122 is provided in the rear end zone of profiled section 123 which it is preferably made in one piece with.

It is pointed out that in certain cases it is not necessary to use connecting members, such as shown in FIGS. 14 and 15. It is also possible to use male and female connecting members without a profiled section 113 or 123, such as described hereinbefore in conjunction with FIGS. 1 to 12. In this case, the connecting members have no profiled section and this is then replaced by the median branch or zone of the side member which is welded to the retaining partition, either with reference to the front end of the side member in the case of the male member, or retracted relative to the front end of the side member in the case of the female member. Thus, in front of the retaining partition, there is a groove section whose length is at least equal to the longitudinal projecting portion of the male connecting member.

In analogous manner to side member 102 provided with male connecting member 120, side member 102' is provided at its terminal zone and with reference to its median zone or branch 102'c with an assembly opening 102'e, whose two upper and lower edges are horizontal and whose base is vertical and parallel to the end front base 102'd of said side member 102'. The female connecting member 120 is fixed in its assembly opening 102'e by a weld bead 104'.

The retaining partition 112 and the projecting portion or tongue 113 connected to the partition 111 of male connecting member 110 have a longitudinal slot 114 and retaining partition 112 of female connecting member 120 also has longitudinal slot 124, said slots 114 and 124 having a cylindrical shape with regard to partitions 112 and 132. The front zone 114a of the slot 114, i.e. the front zone located level with projecting portion 113 has a flared configuration, for example, a truncated cone shape which widens towards the front end of the projecting portion 113.

The longitudinal slots 114 and 124 are laterally accessible from the outside of each side member 102 or 102' like longitudinal grooves 102b and 102'b of side member 102, 102', but in this case the accessibility is assured by means of access openings 115 or 125 which extend horizontally and parallel to the longitudinal axis of slots 114 and 124 and are made in the body of the retaining partitions 112, 122 and of the projecting portion 113 approximately at mid height of the latter. With regard to the retaining partitions 112, 122, the access openings are defined by the horizontal edges 115a, 125a, which are connected on the one hand to the cylindrical wall of the slot 114, 124 and on the other hand to the preferably vertical, outer lateral face 112b or 122b of the corresponding retaining partition 112, 122. The spacing between the two horizontal edges 115a, 125a of access opening 115, 125 is less than the diameter of the cylindrical portion of the corresponding slot 114, 124. The projecting portion 113 has an access opening 115b which opens out towards the front and which is extended up to the vertical axial plane $P_1$ (cf FIG. 16) of the front area 114a of slot 114. Thus, the planar faces 115c which at the top and bottom define the access opening 115d of projecting portion 113 are parallel to the generating lines 114b of front area 114a of slot 114, said generating lines 114b being located in the vertical radial plane $P_1$ of the said slot 114. The coupling device 100 also comprises a connecting spindle 130 which, at each end, is provided with an abutment flange 140, 141, whereby the distance between the flanges 140 and 141, i.e. the length of the connecting spindle 130 is at least equal to the distance between the two rear faces 112c and 122c of the two retaining partitions 112 and 122 of a coupling device 100 when the side members 102 and 102' are in the close together position (FIG. 2) and is preferably roughly double the said distance. The connecting spindle 130 can be made in one piece, as is the case with the embodiment shown in FIGS. 31 and 32. However, this spindle 130 can also comprise several connecting rods, for example, two connecting rods 131, 132, as is the case in certain embodiments of the present invention.

In FIGS. 31 and 32, the end of spindle 130, shown in vertical and horizontal sections is associated with the retaining partition 122 of female connecting member 120. Spindle 130 has a cross-section which is inscribed in a circle and whose periphery is formed by two diametrically opposite, circular arc edges 133a and 133b as well as, between the corresponding ends of the two edges 133a, 133b two straight sides 133c, 133d parallel to a radial plane which divides each edge 133a, 133b into two equal portions. The diameter of cylindrical portion 133a, 133b of spindle 130 is slightly less than the diameter of the corresponding slot 124 made in partition 122 and the distance between the parallel flat faces or flats 133c and 133d is slightly less than the spacing of the edges 125a of access opening 125 of the said slot 122. Obviously, the slot and access opening of the retaining partition of the male connecting member are designed in an identical manner to the members described hereinbefore in conjunction with the female connecting member 120.

The coupling device 100 further comprises locking means 150 which in the case of the embodiments shown in FIGS. 31 and 32 are constituted by a flat locking strip 151 made in the form of a rectilinear sprung steel strip or plate, whose length is slightly greater than that of the connecting spindle 130 but less than the sum of the lengths of spindle 130 and its two flanges 140 and 141, as well as by two locking recesses 152, each made in an abutment flange 140 or 140 starting from the front abutment face 140a or 141a and on the side and in the extension of one of the flats 133c of 133d of spindle 130 in such a way that two side walls of said locking recess 152 are parallel to flat 133c or 133d. Furthermore, the width and thickness of the locking recess 152 are only slightly greater than those of strip 151, whereof the ends engage in the locking recesses 152 if said strip 151 is curved. To facilitate the introduction of the end of the strip into its locking recess 152, between the edge, for example straight edge 140b or 141b of stop face 140a or 141a of flange 140 or 141 an inclined ramp 153 is provided. It is readily comprehensible that the width of the strip is only slightly less than the distance between the two edges 115a or 125a of access opening 115 or 125 and that each strip 152 is integral with spindle 130 and is located in the access openings 115 and 125, whereby spindle 130 is perfectly locked in its slots 114 and 124, so as to prevent any unexpected lateral displacement, but nevertheless, the axial displacement thereof is still possible (cf particularly FIG. 31). The abutment flanges 140 and 141 are located behind the rear face 112c and 122c of partitions 112 and 122 in locating grooves 113 and 102b and 123 or 102'b which are laterally accessible to the said flanges 140 and 141. It is important within the scope of the present invention that the cross-section of the spindle 130 or connecting rods 131 and 132 which comprise the latter, has or have at least during the fitting thereof into the slots 114 and 124 and during the removal thereof from the said slots different dimensions in at least two directions, which are preferably perpendicular to one another and that at least with regard to the retaining partitions 112 and 122, the width of the access openings 114 and 124 is less than the maximum dimension, but greater than the minimum dimension of the cross-section of the said spindle 130. In the case of the embodiment shown in FIGS. 31 and 32 showing a spindle 130 made in one piece, the maximum dimension of the cross-section is determined by the diameter of the cylindrical portion 133a and 133b and the minimum dimension is determined by the distance between two flats 133c and 133d of the said spindle 130.

However, this principle is also verified when the connecting spindle comprises a plurality, more particularly two connecting rods 131 and 132 which have at each end an abutment flange 142a, 142b and 143a, 143b. The crosssections of the two connecting rods 131 and 132 are each inscribed in a semi-circle and are preferably semi-circular. Each connecting rod 131, 132 has a periphery comprising a so-called bearing face 131a, 132a which is semicylindrical and a flat face called a contact face 131b and 132b, located in the radial plane of the semi-cylindrical bearing face 131a, 132a, said radial plane passing via the longitudinal edges of the said bearing face 131a, 132a and which serves to bear against the contact face 132b or 131b of the other connecting rod 132 or 131 when these two connecting rods 131 and 132 are joined in slots 114 and 124 of connecting members 110 and 120 thus forming the connecting spindle 130. The contact faces 131b and 132b extend at least approximately in the direction of the maximum dimension of spindle 130, said maximum dimension being determined by the diameter or the double radius of curvature of the semi-cylinder of the bearing face 131a, 132a. The minimum dimension of the spindle 130 and therefore the connecting rods 131, 132 is given in this case by the radius of curvature of the semi-cylindrical bearing face 131a, 132a. However, rod 131, 132 could also have a flat which is parallel to contact face 131b, 132b. In this case, the minimum dimension is determined by the distance between the contact face 131b, 132b and the corresponding flat of connecting rod 131, 132.

The abutment flanges 142a, 142b and 143a, 143b also have a semi-cylindrical shape, but their diameter is greater than that of the corresponding connecting rod in such a way as to have a stop face 144 in the form of an annular shoulder. Each abutment flange also has a contact face 145 which is aligned with the contact face 131b, 132b of connecting rods 131 and 132. On its semi-cylindrical face 146 each flange 142a, 142b, 143a and 143b can comprise a flat 147 which is parallel to contact face 145 and optionally serves to support one of the locking means 150.

On its front face 148, each abutment flange 142a, 142b and 143a, 143b is provided with a retaining lug 154, forming part of the locking means 150 and which has a retaining face 154a parallel to contact faces 131b, 132b and 145 of the connecting rods 131 and 132 and flanges 142a, 142b, 143a, and 143b and adjacent to the latter. The cross-section of lug 154 is, for example, rectangular. Lug 154 also has an oblique guidance face 154b which forms a dihedron with the retaining face 154a and which is inclined downwards in the directon of flat 147. The locking means 150 also have a flat locking strip 155 which is made from a resilient sprung steel and which at its ends which are spaced from one another by a distance slightly greater than the length of the connecting rod and the corresponding two abutment flanges is provided with lateral flange members 156 which are curved perpendicular to strip 155 and whereof each has a locking opening 156a whose cross-section is the same as that of lug 154, but slightly larger than the latter. The distance between the locking opening 156a and strip 155 is such that the latter is engaged in access openings 115 and 125 when lugs 154 penetrate openings 156a and are thus covered by the lateral flange members 156. In this position, strip 155 is very close to is applied against the flats 147 of flanges 142a, 142b of connecting rod 131, which is adjacent to the access openings 115, 125 (rod 131 in FIGS. 14, 15 and 18). Strip 155 and the lateral elastic flange members 156 together constitute a type of locking clip which, once engaged in the access openings prevents the connecting rod 131, to which it is fixed, from appearing with its small dimension in front of the access openings. To prevent significant pivoting of the connecting rods 131, 132, it is merely necessary to give locking strip 155 a slightly smaller width than the access openings 115, 125. Under these conditions, it is obvious that the second rod 132 is also unable to appear in front of access openings 115 and 125 in a position which would permit its lateral removal. To facilitate the introduction of connecting rods 131, 132 in their slots 114, 124, the latter are given a diameter about 10 to 25% greater than that of connecting rod 131 or 132.

FIG. 16 schematically shows the introduction phase of the second rod 131 into the slot 124 of the female connecting member 120. FIG. 17 shows the two connecting rods 131, 132 which in slot 124 form the connecting spindle 130. FIG. 18 shows schematically the locking of the two rods 131, 132 in slot 114 of male connecting member 110 by means of the locking clip 155, 156 cooperating with the retaining lug 154 of the abutment flange 142a, integral with the connecting rod 131 which is located in the immediate vicinity of access openings 115, 125.

FIGS. 19 and 20 show another embodiment of the locking means 150. In the case of the previously described embodiments (FIGS. 14 to 18) the two connecting rods 131, 132 can move axially relative to one another. It is possible to use the locking means 150 for at least axially and preferably also rotationally connect the two rods 131, 132. To this end, the abutment flange 142a, 142b and 143a, 143b of each connecting rod 131, 132 has two retaining lugs 157, 158 which are aligned parallel to contact face 145. In the vertical position of the flange, the upper lug 157 has on its upper side a collar 157a which defines with the front face 148 of the flange a type of retaining groove and the lower lug 158 has on its lower side a collar 158a which also defines a retaining groove with the said front face 148. Between the lower lateral face 157b of the upper lug 157 and the upper lateral face 158b of lower lug 158 is defined a jamming passage 159, whose width is just larger than double the thickness of the sprung steel locking strip, having undulated ends 160a, 160b. Thus, the assembly of the two connecting rods 131, 132 is provided at each end with four retaining lugs 157, 158, about which is passed the locking strip 160, whose length is sufficient to enable the two end portions to be located in the jamming passage of one of the two pairs of lugs 157, 158, whereby the undulated ends 160a, 160b are located in the zone defined by the four lugs 157, 158 of the two juxtaposed abutment flanges 142a, 143a or 142b and 143b and drawn against one another by the said strip 160, when the latter surrounds all four lugs 157, 158 (FIG. 20). Under these conditions, strip 160 prevents, by cooperating with the side walls of the retaining grooves, too large an axial displacement of one connecting rod relative to the other, but permits the common pivoting of said rods. As one of the rods is always prevented from moving radially in its slot 114, 124, whilst the other rod is rendered integral with the first rod by strip 160, said other rod cannot move out of the said slot, even when it is located in a good position in front of access opening 115, 125.

As can be seen in FIG. 21, the locking means 150 can also comprise, on the one hand, two transverse bores 161, 162, aligned with one another, each being provided in one of the two abutment flanges 142, 143a, 142b and 143b in such a way that their axes are perpendicular to contact face 145 and located in a radial plane of the flanges, and, on the other hand, a connecting pin 163 provided at one end with a countersunk head 163a and at its other end with a transverse opening passing beyond the flat 147 of flange 143 and serving to receive a locking pin 164.

FIGS. 22 to 24 show several embodiments of the locking means 150. As in the embodiments relative to FIGS. 14 to 18, each front face 148 of an abutment flange 1422, 143a, 142b and 132b has a parallelepipedic retaining lug 165, having a rectangular cross-section. The two lateral faces 165a, perpendicular to contact face 145, are each surmountable by a retaining shoulder 165b which defines with the front face 148 and the corresponding side face 165a a retaining groove for a sprung steel ribbon 166 which constitutes the type of clip and given a U shape with the ends of branches 166a, lowered towards the side face 165c, parallel to the contact face 145 and to flat 147 and located in the vicinity of the latter. The side face 165c of lug 165 is located in the vicinity of access opening 115 or 125. The base 166b of ribbon 166 can be applied at least approximately against the side face 165d of lug 165, located on the base side of slot 114 or 124 and belonging to the other flange 143a (upper portion of FIG. 23).

However, it is also possible to give ribbon 166 lateral branches 166a which are sufficiently long to enable the base 166b of said ribbon 166 to touch the base of longitudinal groove 102b of side member 102, thus preventing a significant pivoting of the two connecting rods 131, 132. In this case, it is advantageous to provide a bent portion 166c in the lateral branches 166a, whereby said bent portion 166c is, for example, applied against a marginal portion of the rear side face 165d of lug 165 of flange 143a located in the vicinity of the base of slot 114 or 124 and of longitudinal groove 102b or 102'b of side member 102 or 102' (lower portion of FIG. 10). In the two cases described hereinbefore, the two rods 131, 132 are integral with one another, both in axial displacement and in pivoting, but in the latter case, a significant pivoting is prevented by the interaction between the base 166b of clip 166 and the base of the longitudinal groove 102b of side member 102.

The locking means 150 can also have, on the one hand, for each abutment flange 142a and 143a and 143b and 142b of the same end of the connecting rods 131, 132 an annular locating groove 167 which opens out in a place perpendicular to the axis of the said rods 131, 132 and which is provided in the cylindrical lateral face 146 of said flanges and, on the other hand, a locking clip 168 having an annular configuration and which is to be placed in the said locating groove 167 and which has bent ends 168a which are to be applied against the flat 147 of flange 142a located in the vicinity of access opening 115 or 125. As a result of this design, the connecting rods 131, 132 are integral with one another both in axial displacement and in pivotal movement.

To make the two connecting rods 131, 132 integral with one another in axial displacement, it is also possible to use lateral flange members 156 of locking strip 155. To this end, the lateral side members 156 are extended beyond the flanges 142a and 142b, against which is applied strip 155, in such a way as to also cover the flanges 143a and 143b of the adjacent rod 132, whereby said flanges 143a, 143b are remote from strip 155. In this case, the ends 156b of the lateral flange members 156 are curved and the lateral flange members 156 have locking openings 156a, which are spaced from strip 155 by a distance which is sufficient to be able to cover either the lug 154' of flange 142a or 142b located in the vicinity of strip 155 (left-hand side of FIG. 20) or the lug 154" of flange 143a or 143b, remote from the said strip 55 (right-hand side of FIG. 25).

In order to avoid any shearing of the locking ribbons or the lateral flange members of the locking strip, the abutment flanges can be designed in such a way that they overlap or are mutually fitted into one another by their contact faces 145. Thus, as can be seen on the left-hand side of FIG. 25 and in FIG. 26, the flange 142a has a stepped contact face 145, whose relief portion 145a penetrates the hollow 145b formed by the negative step made in the contact face 145 of adjacent flange 143a. It is also possible for the contact face 145 of flange 142b to completely overhang the contact face 131b of corresponding rod 131 and for the contact face 145 of the adjacent flange 143b to be entirely retracted by an appropriate distance relative to the contact face 132b of connecting rod 132, which is thus partly covered by flange 142b of adjacent rod 131 (right-hand side of FIG. 25).

FIGS. 27 and 28 show front views of the coupling device, on the one hand, from the side of the male coupling member 110 (FIG. 27) and, on the other, from the side of the female coupling member 120 (FIG. 28), in conformity with the embodiment shown in FIGS. 25 and 26. In FIGS. 27 and 28, it can be seen that the locking strip 155, once mounted on flange 142a or 143b of one or other of the two connecting rods 131, 132 is engaged in the access openings 115 and 125, thus preventing any significant pivoting of the rods 131, 132, whilst maintaining them in the position in which any untimely lateral removal thereof is impossible.

The construction of the locking means 150, shown in FIGS. 29 and 30, is in principle the same as that described in conjunction with FIGS. 31 and 32, but in the present case instead of being applied to the connecting spindle 130, it is applied to the connecting rod 131 and its abutment flanges 142a, 142b, located in the vicinity of access openings 115, 125. Each of the flanges 142a, 142b is provided, from its stop face and from the side remote from the contact face 145 with a locking recess 152 whose longitudinal walls are parallel to the contact face 145 and which is arranged substantially tangentially to the cylindrical bearing face 131a of rod 131. An acces ramp of face 153, inclined from the flap 147 of flange 142a or 142b towards the base of locking recess 152, facilitates the introduction of the ends of the flat, rectilinear, elastic strip 155 into the said recess, whose dimensions are only slightly greater than the width and thickness of the said strip 155. For its introduction into recesses 152, strip 155 must be bent so as to bring together its ends to the distance between the openings of the two recesses 152, whereby access ramps 153 do not constitute an obstacle to the bending of strip 155.

Obviously, the embodiments described hereinbefore can undergo a certain number of modifications without passing beyond the scope of the present invention. In particular, the various constituent parts of the coupling device can be combined in different sequences from those described hereinbefore.

What is claimed is:

1. A coupling device between two adjacent tubs of a scraper conveyor for mines, in which each tub comprises side members each having two superimposed lateral branches which are turned towards the inside and have between them an externally open longitudinal groove and which are arranged symmetrically relative to the vertical median plane of the tub, being joined together along a central longitudinal zone by a median plate and which have a preferably inverted M or sigma-shaped profile, said coupling device being of the type comprising a male connecting member integral with one of the ends of a side member, a female connecting member integral with the other end of the same side member, each of said connecting members being equipped with a retaining partition, a longitudinal slot and a lateral access opening issuing into said slot, a connecting spindle having two abutment flanges and which can be inserted into or removed from the slots via the access openings of the said members when the latter are at least approximately aligned and brought adjacent with one another, a recess for one of the abutment flanges located to the rear of the corresponding retaining partition, as well as locking means for preventing the spindle from unexpectedly moving out of the slots of the said connecting members, whereby the flanges of said spindle serve to bear against the corresponding retaining partition so as to permit the transmission of tensile stresses between two adjacent tubs, the male connecting member having a male guidance member or projecting portion which longitudinally projects beyond the corresponding side member and the female connecting member has a female guidance portion such as a connecting cavity serving to receive said male member, wherein the recesses for the abutment flanges are also laterally accessible, like the said access openings, the retaining partition of the male connecting member is located behind the projecting portion of the said member, the cross section of the connecting spindle has, at least during the fitting of said spindle in the slot and during its removal from the said slot different dimensions in at least two directions which are preferably perpendicular to one another, with regard to the retaining partition the width of the access opening of each connecting member is less than the maximum dimension but more than the minimum dimension of the cross section of said spindle and the locking means of said spindle are arranged in such a way as to prevent the spindle from appearing in front of the access opening in a position in which the small dimension of its cross section coincides with the width of the said access opening wherein the locking means of the connecting spindle comprises retaining grips formed in the retaining partitions in the vicinity of the access openings thereof and the rear faces of the retaining partitions each serves as a supporting face against which can bear one of the abutment flanges, and wherein the connecting spindle has a cylindrical shape and, on the one hand, is provided with two parallel flats, spaced from one another by a distance less than the minimum height of the lateral opening and, on the other hand, has a diameter which is at least slightly less than the maximum diameter of the locating slot, but greater than the minimum height of said lateral opening and the locking means of the joining member are arranged in such a way that it is maintained in an angular position relative to the edges of said access openings.

2. A coupling device as claimed in claim 1, wherein the locking means are arranged in such a way that the connecting spindle is maintained in the slots in a position in which the flats of the said spindle are inclined, preferably by 90°, relative to the edges of the said access opening.

3. A coupling device as claimed in claim 1, wherein the two said parallel flats of the connecting spindle at a small distance from at least one of the abutment flanges, whereby the connecting spindle has at least one end whose cylindrical periphery is of entirely closed circular cross section in the immediate vicinity of one of the abutment flanges.

4. A coupling device as claimed in claim 1, wherein the locking means comprise at least one locking wedge fixed to one end of the connecting spindle, in the vicinity of an abutment flange and parallel to a flat.

5. A coupling device as claimed in claim 4, wherein the height of the locking wedge is slightly less than the spacing between the edges defining the corresponding access openings.

6. A coupling device as claimed in claim 5, wherein the locking wedge and retaining partition are provided with holes which can, on the one hand, be aligned when the said wedge is engaged in the access opening of the said partition and, on the other, can receive a locking pin.

7. A coupling device as claimed in claim 1, wherein the recesses for the abutment flanges comprise a portion of the longitudinal groove of the said member.

8. A coupling device as claimed in claim 4, wherein the locking wedge and retaining partition are provided with holes which can, on the one hand, be aligned when the said wedge is engaged in the access opening of the said partition and, on the other, can receive a locking pin.

* * * * *